United States Patent
Ninomiya et al.

(10) Patent No.: US 9,487,687 B2
(45) Date of Patent: Nov. 8, 2016

(54) BOOKBINDING ADHESIVE

(71) Applicant: DIC Corporation, Tokyo (JP)

(72) Inventors: Atsushi Ninomiya, Osaka (JP); Yukihiko Minamida, Osaka (JP); Toyokuni Fujiwara, Osaka (JP); Ryou Nonaka, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/024,798

(22) PCT Filed: Aug. 7, 2014

(86) PCT No.: PCT/JP2014/070848
§ 371 (c)(1),
(2) Date: Mar. 24, 2016

(87) PCT Pub. No.: WO2015/045635
PCT Pub. Date: Apr. 2, 2015

(65) Prior Publication Data
US 2016/0215186 A1    Jul. 28, 2016

(30) Foreign Application Priority Data

Sep. 27, 2013  (JP) ................................ 2013-201482

(51) Int. Cl.
| | |
|---|---|
| *C09J 175/08* | (2006.01) |
| *C09J 175/04* | (2006.01) |
| *C08G 18/48* | (2006.01) |
| *C08G 18/62* | (2006.01) |
| *C08G 18/40* | (2006.01) |
| *C08G 18/42* | (2006.01) |
| *C08G 18/76* | (2006.01) |

(52) U.S. Cl.
CPC .......... *C09J 175/08* (2013.01); *C08G 18/4018* (2013.01); *C08G 18/4063* (2013.01); *C08G 18/4202* (2013.01); *C08G 18/4238* (2013.01); *C08G 18/4277* (2013.01); *C08G 18/4825* (2013.01); *C08G 18/6229* (2013.01); *C08G 18/7671* (2013.01); *C08G 2170/20* (2013.01)

(58) Field of Classification Search
None
See application file for complete search history.

(56) References Cited

U.S. PATENT DOCUMENTS

| | | | | |
|---|---|---|---|---|
| 6,465,104 | B1 * | 10/2002 | Krebs | .................... C08G 18/12 |
| | | | | 156/331.4 |
| 6,844,073 | B1 | 1/2005 | Helmeke et al. | |
| 2002/0120088 | A1 * | 8/2002 | Hellwig | ................. C08G 18/12 |
| | | | | 528/44 |
| 2013/0210989 | A1 | 8/2013 | Krebs et al. | |

FOREIGN PATENT DOCUMENTS

| | | |
|---|---|---|
| JP | H11-124560 A | 5/1999 |
| JP | 2000-225782 A | 8/2000 |
| JP | 2007-211150 A | 8/2007 |
| JP | 2010-275409 A | 12/2010 |
| WO | 2013/061790 A1 | 5/2013 |

OTHER PUBLICATIONS

International Search Report issued in corresponding Application No. PCT/JP2014/070848, dated Nov. 18, 2014.

* cited by examiner

*Primary Examiner* — Randy Gulakowski
*Assistant Examiner* — Christopher M Rodd
(74) *Attorney, Agent, or Firm* — McDermott Will & Emery LLP

(57) ABSTRACT

An object to be achieved by the present invention is to provide a bookbinding adhesive which is excellent in high-speed application properties, cutting properties, book opening properties, and bookbinding strength. The present invention is directed to a bookbinding adhesive characterized by having a melt viscosity in the range of from 1,000 to 10,000 mPa·s, as measured at 120° C. by means of a cone plate viscometer, exhibiting a JIS A hardness of 20 or more, as measured with respect to the adhesive which is applied and allowed to stand for 30 minutes, in an atmosphere at 23° C., and exhibiting a JIS A hardness of 95 or less, as measured with respect to the adhesive which is applied and allowed to stand for 30 minutes, in an atmosphere at 23° C., and is then allowed to stand in an atmosphere at 23° C. and at a humidity of 50% for one week, wherein a cured film of the adhesive has an upper yield stress of 7 MPa or less. The bookbinding adhesive is preferably a moisture-curing polyurethane hot-melt adhesive containing an urethane prepolymer having an isocyanate group which is obtained by reacting a polyol (A), which contains a crystalline polyester polyol (a-1) and a polyether polyol (a-2), with a polyisocyanate (B).

1 Claim, No Drawings

BOOKBINDING ADHESIVE

CROSS REFERENCE

This application is the U.S. National Phase under 35 U.S.C. §371 of International Application No. PCT/JP2014/070848, filed on Aug. 7, 2014, which claims the benefit of Japanese Application No. 2013-201482, flied on Sep. 27, 2013, the entire contents of each are hereby incorporated by reference.

TECHNICAL FIELD

The present invention relates to a bookbinding adhesive for bonding sheets of paper and a book cover together.

BACKGROUND ART

A bookbinding adhesive has been widely used for bonding together sheets of paper and a book cover for use in bookbinding, and an EVA (ethylene-vinyl acetate copolymer) adhesive and a moisture-curing polyurethane hot-melt adhesive (RHM) are in the majority in the bookbinding adhesive.

However, the EVA adhesive which has been already known is required to be increased in the thickness of the applied adhesive film for exhibiting a satisfactory bond strength, and, as a result, a problem occurs in that the book obtained by bookbinding using the EVA adhesive has poor book opening properties.

On the other hand, with respect to the conventional moisture-curing polyurethane hot-melt adhesive, there are only those having a high viscosity such that the adhesive overflows an adhesive box or is scattered when it is applied at a high speed, and those having a low viscosity such that the adhesive is too hard, and any of them do not satisfy all the high-speed application properties, the cutting properties, and the book opening properties.

CITATION LIST

Patent Literature

[PTL 1] JP-A-2000-225782

SUMMARY OF INVENTION

Technical Problem

An object to be achieved by the present invention is to provide a bookbinding adhesive which is excellent in high-speed application properties, cutting properties, book opening properties, and bookbinding strength.

Solution to Problem

For solving the above-mentioned problems, the present inventors have focused their attention on the relationship between various parameters of the adhesive and the individual problems, and have conducted extensive and intensive studies.

As a result, it has been found that, by defining the melt viscosity at 120° C., the JIS A hardness of the adhesive, and the upper yield stress of the cured film of the adhesive, all the above-mentioned problems can be solved irrespective of the type of the adhesive, and the present invention has been completed.

Specifically, the present invention is directed to a bookbinding adhesive characterized by having a melt viscosity in the range of from 1,000 to 10,000 mPa·s, as measured at 120° C. by means of a cone plate viscometer, exhibiting a JIS A hardness of 20 or more, as measured with respect to the adhesive which is applied and allowed to stand for 30 minutes, in an atmosphere at 23° C., and exhibiting a JIS A hardness of 95 or less, as measured with respect to the adhesive which is applied and allowed to stand for 30 minutes, in an atmosphere at 23° C., and is then allowed to stand in an atmosphere at 23° C. and at a humidity of 50% for one week, wherein a cured film of the adhesive has an upper yield stress of 7 MPa or less.

Advantageous Effects of Invention

The bookbinding adhesive of the present invention has excellent high-speed application properties, excellent cutting properties, excellent book opening properties, and excellent bookbinding strength. Therefore, the bookbinding adhesive of the present invention is very suitable for bonding sheets of paper and a book cover together. Further, the bookbinding adhesive of the present invention has an appropriate open time (time during which the applied adhesive can be effectively bonded), and can be advantageously used not only in the bookbinding application but also in the fiber bonding and building material lamination application and bonding for optical members.

DESCRIPTION OF EMBODIMENTS

It is necessary that the bookbinding adhesive of the present invention has a melt viscosity in the range of from 1,000 to 10,000 mPa·s, as measured at 120° C. by means of a cone plate viscometer. When the melt viscosity of the adhesive falls outside the above-mentioned range, a problem occurs in that the high-speed application properties and cutting properties become extremely poor, and a problem occurs in that a desired bookbinding strength cannot be obtained. From the viewpoint of facilitating the further improvement of the bookbinding strength, high-speed application properties, and cutting properties, the melt viscosity of the adhesive is preferably in the range of from 2,000 to 8,000 mPa·s, more preferably in the range of from 3,000 to 6,000 mPa·s.

It is necessary that the bookbinding adhesive of the present invention exhibits a JIS A hardness (hereinafter, referred to simply as "initial hardness") of 20 or more, as measured with respect to the adhesive which is applied and allowed to stand for 30 minutes, in an atmosphere at 23° C. When the initial hardness of the adhesive is less than 20, a problem occurs in that the high-speed application properties and cutting properties become extremely poor, and a problem occurs in that a desired bookbinding strength cannot be obtained. From the viewpoint of facilitating the further improvement of the bookbinding strength, high-speed application properties, and cutting properties, the initial hardness of the adhesive is preferably in the range of from 25 to 50, more preferably in the range of from 30 to 45.

It is necessary that the bookbinding adhesive of the present invention exhibits a JIS A hardness (hereinafter, referred to simply as "final hardness") of 95 or less, as measured with respect to the adhesive which is applied and allowed to stand for 30 minutes, in an atmosphere at 23° C., and is further allowed to stand in an atmosphere at 23° C. and at a humidity of 50% for one week. When the final hardness of the adhesive is more than 95, the book opening properties of the book obtained by bookbinding using the adhesive become extremely poor. From the viewpoint of facilitating the further improvement of the book opening properties of the book obtained by bookbinding using the adhesive, the final hardness of the adhesive is more preferably in the range of from 50 to 90.

It is necessary that a cured film of the bookbinding adhesive of the present invention has an upper yield stress of 7 MPa or less. When the upper yield stress of the cured film of the adhesive is more than 7 MPa, the book opening properties of the book obtained by bookbinding using the adhesive become extremely poor. From the viewpoint of facilitating the further improvement of the book opening properties of the book obtained by bookbinding using the adhesive, the upper yield stress of the cured film of the adhesive is more preferably in the range of from 4 to 6 MPa.

When the melt viscosity at 120° C., the initial hardness, the final hardness, and the upper yield stress fall in the respective ranges defined in the present invention as mentioned above, a bookbinding adhesive which satisfies all the high-speed application properties, the cutting properties, the book opening properties, and the bookbinding strength can be obtained, and, as methods for measuring these parameters, for example, there can be mentioned the respective methods described below in the Examples.

With respect to the type of the bookbinding adhesive which can be used in the present invention, any type may be used as long as it satisfies the above-mentioned melt viscosity at 120° C., initial hardness, final hardness, and upper yield stress, and, for example, a moisture-curing polyurethane hot-melt adhesive, an EVA (ethylene-vinyl acetate copolymer) adhesive, an emulsion type hot-melt adhesive, a low-temperature application type hot-melt adhesive, or a solvent-resistant hot-melt adhesive can be used. These adhesives may be used individually or in combination. Of these, from the viewpoint of imparting a satisfactory bond strength per application of the adhesive to further improve the production line speed, and from the viewpoint of facilitating the achievement of the melt viscosity at 120° C., the JIS A hardness, and the upper yield stress in the respective ranges defined in the present invention, a moisture-curing polyurethane hot-melt adhesive is preferably used.

As the moisture-curing polyurethane hot-melt adhesive, there can be used, for example, one containing an urethane prepolymer having an isocyanate group, which is obtained by reacting a polyol (A) and a polyisocyanate (B) with each other.

As the polyol (A), for example, crystalline polyester polyol, polyether polyol, acrylic polyol, polycaprolactone polyol, amorphous polyester polyol, polybutadiene polyol, or dimer diol can be used. Of these, crystalline polyester polyol (a-1) and polyether polyol (a-2) are preferably used from the viewpoint of facilitating the achievement of the melt viscosity at 120° C., the JIS A hardness, and the upper yield stress in the respective ranges defined in the present invention.

As the crystalline polyester polyol (a-1), there can be used, for example, one which is obtained by reacting a compound having a hydroxyl group and a polybasic acid with each other. In the present invention, the term "crystalline" is used for indicating a material such that, in a DSC (differential scanning calorimeter) measurement in accordance with JIS K7121:2012, a peak of heat of crystallization or heat of fusion can be recognized, and the term "amorphous" is used for indicating a material such that the above peak cannot be recognized.

As the compound having a hydroxyl group, for example, ethylene glycol, propylene glycol, butanediol, pentanediol, hexanediol, heptanediol, octanediol, nonanediol, decanediol, trimethylolpropane, trimethylolethane, or glycerol can be used. These compounds may be used individually or in combination. Of these, from the viewpoint of increasing the crystalline properties to further improve the bond strength, butanediol, hexanediol, octanediol, or decanediol is preferably used.

As the polybasic acid, for example, oxalic acid, malonic acid, succinic acid, adipic acid, sebacic acid, azelaic acid, or 1,12-dodecanedicarboxylic acid can be used. These polybasic acids may be used individually or in combination.

From the viewpoint of the open time and bond strength, the number average molecular weight of the crystalline polyester polyol (a-1) is preferably in the range of from 500 to 5,000, more preferably in the range of from 1,000 to 4,000. The number average molecular weight of the crystalline polyester polyol (a-1) indicates a value measured by a gel permeation chromatograph (GPC) method under the following conditions.

Measurement apparatus: High performance GPC apparatus ("HLC-8220GPC", manufactured by Tosoh Corp.)
Columns: The columns shown below, manufactured by Tosoh Corp., which are connected in series, were used.
  "TSKgel G5000" (7.8 mm I.D.×30 cm)×1
  "TSKgel G4000" (7.8 mm I.D.×30 cm)×1
  "TSKgel G3000" (7.8 mm I.D.×30 cm)×1
  "TSKgel G2000" (7.8 mm I.D.×30 cm)×1
Detector: RI (Differential refractometer)
Column temperature: 40° C.
Eluent: Tetrahydrofuran (THF)
Flow rate: 1.0 mL/minute
Amount of the sample per injection: 100 µL (tetrahydrofuran solution having a sample concentration of 0.4% by mass)
Standard sample: A calibration curve was formed using the standard polystyrenes shown below.
(Standard Polystyrenes)
"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

The glass transition temperature of the crystalline polyester polyol (a-1) is preferably in the range of from 40 to 130° C. The glass transition temperature of the crystalline polyester polyol (a-1) indicates a value measured by DSC in accordance with JIS K7121-1987, specifically indicates a value obtained by placing the crystalline polyester polyol (a-1) in an apparatus of differential scanning calorimeter, and increasing the temperature to the (glass transition temperature+50° C.) at a temperature increase rate of 10° C./minute, and then maintaining the polyol at that temperature for 3 minutes, and then rapidly cooling the polyol, and reading an intermediate-point glass transition temperature (Tmg) from the obtained differential thermal curve.

As the polyether polyol (a-2), for example, polyethylene glycol, polypropylene glycol, polybutylene glycol, polytetramethylene glycol, or ethylene oxide-modified polypropylene glycol can be used. These polyether polyols may be used individually or in combination.

From the viewpoint of facilitating the further improvement of the melt viscosity, open time, flexibility, and bond strength, the number average molecular weight of the polyether polyol (a-2) is preferably in the range of from 500 to 5,000, more preferably in the range of from 700 to 4,000. The number average molecular weight of the polyether polyol (a-2) indicates a value measured in the same manner as in the measurement of the number average molecular weight of the crystalline polyester polyol (a-1).

When the crystalline polyester polyol (a-1) and polyether polyol (a-2) are used as the polyol (A), the total amount of the polyol (a-1) and the polyol (a-2) is preferably 40% by mass or more, more preferably in the range of from 50 to 100% by mass, based on the mass of the polyol (A).

When the crystalline polyester polyol (a-1) and polyether polyol (a-2) are used as the polyol (A), the mass ratio of the polyol (a-1) and the polyol (a-2) [(a-1)/(a-2)] is preferably in the range of from 80/20 to 20/80, more preferably in the range of from 70/30 to 30/70.

From the viewpoint of facilitating the further improvement of the open time and bond strength, the polyol (A) preferably further contains an acrylic polyol (a-3) and/or a polycaprolactone polyol (a-4).

The acrylic polyol (a-3) is, for example, obtained by polymerizing (a) an (meth)acrylic compound essentially containing (a) an (meth)acrylic compound having a hydroxyl group. In the present invention, the term "(meth) acrylic compound" indicates a methacrylic compound and/or an acrylic compound, the term "(meth)acrylate" indicates a methacrylate and/or an acrylate, and the term "(meth) acrylic acid" indicates methacrylic acid and/or acrylic acid.

As the (meth)acrylic compound having a hydroxyl group, for example, 2-hydroxyethyl (meth)acrylate, hydroxypropyl (meth)acrylate, or hydroxybutyl (meth)acrylate can be used. These compounds may be used individually or in combination.

As the other (meth)acrylic compound, for example, (meth)acrylic acid; (a) an (meth)acrylic acid alkyl ester (meth)acrylic acid alkyl ester, such as methyl (meth)acrylate, ethyl (meth)acrylate, n-butyl (meth)acrylate, isobutyl (meth)acrylate, tert-butyl (meth)acrylate, neopentyl (meth) acrylate, 2-ethylhexyl (meth)acrylate, octyl (meth)acrylate, stearyl (meth)acrylate, isostearyl (meth)acrylate, cetyl (meth)acrylate, or lauryl (meth)acrylate; (a) an (meth)acrylic compound having a fluorine atom, such as 2,2,2-trifluoroethyl (meth)acrylate, 2,2,3,3-tetrafluoropropyl (meth)acrylate, 1H,1H,5H-octafluoropentyl (meth)acrylate, or 2-(perfluorooctyl)ethyl (meth)acrylate; (a) an (meth)acrylic compound having an alicyclic structure, such as isobornyl (meth)acrylate, cyclohexyl (meth)acrylate, dicyclopentanyl (meth)acrylate, or dicyclopentenyloxyethyl (meth)acrylate; (a) an (meth)acrylic compound having an ether group, such as polyethylene glycol mono(meth)acrylate, methoxyethyl (meth)acrylate, methoxybutyl (meth)acrylate, methoxytriethylene glycol (meth)acrylate, or methoxypolyethylene glycol (meth)acrylate; benzyl (meth)acrylate, 2-ethyl-2-methyl-[1,3]-dioxolan-4-yl-methyl (meth)acrylate, or dimethylaminoethyl (meth)acrylate can be used. These (meth) acrylic compounds may be used individually or in combination. Of these, from the viewpoint of facilitating the further improvement of the open time and bond strength, the (meth)acrylic compound having a hydroxyl group and the (meth)acrylic acid alkyl ester are preferably used, and 2-hydroxyethyl (meth)acrylate, methyl (meth)acrylate, and n-butyl (meth)acrylate are preferably used.

From the viewpoint of facilitating the further improvement of the open time and bond strength, the number average molecular weight of the acrylic polyol (a-3) is preferably in the range of from 5,000 to 50,000, more preferably in the range of from 10,000 to 30,000. The number average molecular weight of the acrylic polyol (a-3) indicates a value measured in the same manner as in the measurement of the number average molecular weight of the crystalline polyester polyol (a-1).

From the viewpoint of facilitating the further improvement of the open time and bond strength, the glass transition temperature of the acrylic polyol (a-3) is preferably in the range of from 30 to 120° C., more preferably in the range of from 50 to 80° C. The glass transition temperature of the acrylic polyol (a-3) indicates a value measured in the same manner as in the measurement of the glass transition temperature of the crystalline polyester polyol (a-1).

When the acrylic polyol (a-3) is used, the amount of the acrylic polyol (a-3) used is preferably in the range of from 1 to 30% by mass, more preferably in the range of from 3 to 20% by mass, based on the mass of the polyol (A).

As the polycaprolactone polyol (a-4), there can be used, for example, one which is obtained by reacting the above-mentioned compound having a hydroxyl group and ε-caprolactone with each other.

From the viewpoint of facilitating the further improvement of the open time and bond strength, the number average molecular weight of the polycaprolactone polyol (a-4) is preferably in the range of from 5,000 to 200,000, more preferably in the range of from 10,000 to 50,000.

When the polycaprolactone polyol (a-4) is used, the amount of the polycaprolactone polyol (a-4) used is preferably in the range of from 1 to 30% by mass, more preferably in the range of from 3 to 20% by mass, based on the mass of the polyol (A).

As the polyisocyanate (B), for example, an aromatic polyisocyanate, such as polymethylene polyphenyl polyisocyanate, diphenylmethane diisocyanate, carbodiimide-modified diphenylmethane diisocyanate isocyanate, xylylene diisocyanate, phenylene diisocyanate, tolylene diisocyanate, or naphthalene diisocyanate; or an aliphatic or alicyclic polyisocyanate, such as hexamethylene diisocyanate, cyclohexane diisocyanate, isophorone diisocyanate, dicyclohexylmethane diisocyanate, or tetramethylxylylene diisocyanate, can be used. These polyisocyanates may be used individually or in combination. Of these, from the viewpoint of the reactivity and bond strength, an aromatic polyisocyanate is preferably used, and diphenylmethane diisocyanate is more preferably used.

The urethane prepolymer is obtained by reacting the polyol (A) and the polyisocyanate (B) with each other, and has an isocyanate group capable of reacting with water present in air or in a substrate to which the urethane prepolymer is applied to form a crosslinked structure.

With respect to the method for producing the urethane prepolymer, for example, the urethane prepolymer can be produced by dropwise adding a mixture of the polyol (A) to a reaction vessel containing the polyisocyanate (B), and then heating the mixture to effect a reaction under conditions such that the isocyanate groups in the polyisocyanate (B) are excess relative to the hydroxyl groups in the polyol (A).

In producing the urethane prepolymer, from the viewpoint of the bond strength and flexibility, the equivalent ratio of the isocyanate groups in the polyisocyanate (B) and the hydroxyl groups in the polyol (A) (isocyanate group/hydroxyl group) is preferably in the range of from 1.1 to 5, more preferably in the range of from 1.5 to 3.

From the viewpoint of facilitating the achievement of the melt viscosity at 120° C., the JIS A hardness, and the upper yield stress in the respective ranges defined in the present invention, the isocyanate group content (hereinafter, referred to simply as "NCO %") of the urethane prepolymer obtained by the above-mentioned method is preferably in the range of from 1.5 to 8% by mass, more preferably in the range of from 1.7 to 5, further preferably in the range of from 1.8 to 3. The NCO % of the urethane prepolymer indicates a value measured by a potentiometric titration method in accordance with JIS K1603-1:2007.

The moisture-curing polyurethane hot-melt adhesive contains the above-mentioned urethane prepolymer, and, if necessary, may contain the other additive.

As the other additive, for example, a curing catalyst, an antioxidant, a tackifier, a plasticizer, a stabilizer, a filler, a dye, a pigment, a fluorescent brightener, a silane coupling agent, a wax, or a thermoplastic resin can be used. These additives may be used individually or in combination.

As a method used in the present invention for bookbinding using the bookbinding adhesive, there can be mentioned, for example, a method in which the bookbinding adhesive is applied to the surface of a sheaf of a plurality of sheets of paper to be bonded and the surface of a book cover to be bonded, and the sheets of paper and the book cover are put together and bonded to each other.

As a method for applying the bookbinding adhesive to the surface to be bonded, a coater method, such as a roll coater, a spray coater, a T-die coater, a knife coater, or a comma coater, a precision method, such as a dispenser, ink-jet printing, screen printing, or offset printing, or the like can be used.

After the sheets of paper and the book cover are bonded together, the bonded material is preferably subjected to drying and maturing by a known method according to the type of the bookbinding adhesive used.

The thickness of the adhesive layer generally in the range of from 0.001 to 0.5 cm can be appropriately determined according to the bookbinding adhesive.

EXAMPLES

Hereinbelow, the present invention will be described in more detail with reference to the following Examples.

Example 1

In a four-neck flask equipped with a stirrer and a thermometer, 36 parts by mass of crystalline polyester polyol-1 (which is obtained by reacting 1,6-hexanediol and dodecanedioic acid with each other; number average molecular weight: 3,500; hereinafter, crystalline polyesterpolyol-1 is abbreviated to "crystalline PEs-1"), 36 parts by mass of polypropylene glycol (number average molecular weight: 1,000; hereinafter, polypropylene glycol is abbreviated to "PPG"), and 10 parts by mass of acrylic polyol (which is obtained by polymerizing methyl methacrylate, n-butyl methacrylate, and 2-hydroxyethyl methacrylate; number average molecular weight: 20,000; Tmg: 67° C.; hereinafter, the acrylic polyol is abbreviated to "AcPol") were charged and mixed, and the resultant mixture was subjected to dehydration by heating at 100° C. under a reduced pressure until the water content in the flask became 0.05% by mass. The inside of the flask was cooled to 90° C., and then 18 parts by mass of 4,4'-diphenylmethane diisocyanate (hereinafter, abbreviated to "MDI") melted at 70° C. was added to the flask, and the resultant mixture was subjected to reaction in a nitrogen atmosphere at 110° C. for about 3 hours until the NCO % became constant to obtain an urethane prepolymer, and a moisture-curing polyurethane hot-melt adhesive was obtained. The obtained moisture-curing polyurethane hot-melt adhesive was used as a bookbinding adhesive. With respect to the obtained bookbinding adhesive, the following measurements were conducted.

[Method for Measuring a Melt Viscosity at 120° C.]

The bookbinding adhesive was melted at 120° C. for one hour, and then 1 ml of the melted adhesive was taken as a sample and a melt viscosity of the sample was measured by means of a cone plate viscometer (40P cone; number of revolutions of the rotor: 50 rpm).

[Method for Measuring a JIS a Hardness]

The bookbinding adhesive was melted at 120° C. for one hour, and then flowed into a mold in a cylindrical shape having a diameter of 56 mm and a height of 8 mm in an atmosphere at 23° C., and allowed to stand for 30 minutes and then, a JIS A hardness of the surface of the resultant cylindrical shaped material was measured in accordance with JIS K7312-1996. Then, the shaped material was allowed to stand in an atmosphere at 23° C. and at a humidity of 50% for one week and then, a JIS A hardness of the surface of the resultant cylindrical shaped material was measured.

[Method for Measuring an Upper Yield Stress]

The bookbinding adhesive was melted at 120° C., and then applied onto a release-treated polyethylene terephthalate film using an applicator so that the thickness of the adhesive applied became 100 μm. Then, the applied adhesive was allowed to stand under conditions at 23° C. and at a humidity of 50% for one week to obtain a cured film of the bookbinding adhesive. With respect to the obtained cured film having a thickness of 100 μm, an upper yield stress (MPa) was measured in accordance with JIS K7311-1995.

Example 2

In a four-neck flask equipped with a stirrer and a thermometer, 36 parts by mass of crystalline PEs-1, 36 parts by mass of PPG, 5 parts by mass of AcPol, and 5 parts by mass of polycaprolactone polyol (number average molecular weight: 40,000; hereinafter, polycaprolactone polyol is abbreviated to "PCL") were charged and mixed, and the resultant mixture was subjected to dehydration by heating at 100° C. under a reduced pressure until the water content in the flask became 0.05% by mass. The inside of the flask was cooled to 90° C., and then 18 parts by mass of MDI melted at 70° C. was added to the flask, and the resultant mixture was subjected to reaction in a nitrogen atmosphere at 110° C. for about 3 hours until the NCO % became constant to obtain an urethane prepolymer, and a moisture-curing polyurethane hot-melt adhesive was obtained. The obtained moisture-curing polyurethane hot-melt adhesive was used as a bookbinding adhesive. With respect to the obtained bookbinding adhesive, a melt viscosity, a JIS A hardness, and an upper yield stress were measured in the same manner as in Example 1.

Example 3

In a four-neck flask equipped with a stirrer and a thermometer, 20 parts by mass of crystalline PEs-1, 16 parts by mass of crystalline polyester polyol-2 (which is obtained by reacting 1,6-hexanediol and adipic acid with each other; number average molecular weight: 3,500; hereinafter, crystalline polyester polyol-2 is abbreviated to "PEs-2"), 36 parts by mass of PPG, and 10 parts by mass of AcPol were charged and mixed, and the resultant mixture was subjected to dehydration by heating at 100° C. under a reduced pressure until the water content in the flask became 0.05% by mass. The inside of the flask was cooled to 90° C., and then 18 parts by mass of MDI melted at 70° C. was added to the flask, and the resultant mixture was subjected to reaction in a nitrogen atmosphere at 110° C. for about 3 hours until the NCO % became constant to obtain an urethane prepolymer, and a moisture-curing polyurethane hot-melt adhesive was obtained. The obtained moisture-curing polyurethane hot-melt adhesive was used as a bookbinding adhesive. With respect to the obtained bookbinding adhesive, a melt viscosity, a JIS A hardness, and an upper yield stress were measured in the same manner as in Example 1.

Example 4

In a four-neck flask equipped with a stirrer and a thermometer, 20 parts by mass of crystalline PEs-1, 16 parts by mass of PEs-2, 36 parts by mass of PPG, 5 parts by mass of AcPol, and 5 parts by mass of PCL were charged and mixed, and the resultant mixture was subjected to dehydration by heating at 100° C. under a reduced pressure until the water content in the flask became 0.05% by mass. The inside of the flask was cooled to 90° C., and then 18 parts by mass of MDI melted at 70° C. was added to the flask, and the resultant mixture was subjected to reaction in a nitrogen atmosphere at 110° C. for about 3 hours until the NCO % became constant to obtain an urethane prepolymer, and a moisture-curing polyurethane hot-melt adhesive was obtained. The obtained moisture-curing polyurethane hot-melt adhesive was used as a bookbinding adhesive. With respect to the obtained bookbinding adhesive, a melt viscosity, a JIS A hardness, and an upper yield stress were measured in the same manner as in Example 1.

Comparative Example 1

A moisture-curing polyurethane hot-melt adhesive ("Hi-Bon 4852", manufactured by Hitachi Chemical Co., Ltd.) was used as a bookbinding adhesive. With respect to the bookbinding adhesive, a melt viscosity, a JIS A hardness, and an upper yield stress were measured in the same manner as in Example 1.

Comparative Example 2

A moisture-curing polyurethane hot-melt adhesive ("QR3317BR", manufactured by Henkel AG & Co. KGaA) was used as a bookbinding adhesive. With respect to the bookbinding adhesive, a melt viscosity, a JIS A hardness, and an upper yield stress were measured in the same manner as in Example 1.

[Method for Evaluating the High-Speed Application Properties]

Each of the bookbinding adhesives obtained in the Examples and Comparative Examples was melted at 120° C., and introduced into a two-roll coater and the rolls were rotated at a speed of 50 m/minute. In the evaluation of the high-speed application properties, a rating "T" indicates that the adhesive did not overflow the adhesive stops at the both ends of the rolls, and a rating "F" indicates that the adhesive overflowed the adhesive stops.

[Method for Evaluating the Cutting Properties]

Each of the bookbinding adhesives obtained in the Examples and Comparative Examples was melted at 120° C., and applied onto a sheet of paper using an applicator so that the thickness of the adhesive applied became 400 μm, and allowed to stand for 5 minutes, and then the resultant paper sheet was cut by means of a paper cutter to visually examine whether or not an adhesive residue was present on the cutter blade. In the evaluation of the cutting properties, a rating "T" indicates that no adhesive residue was present on the cutter blade, and a rating "F" indicates that an adhesive residue was present on the cutter blade.

[Method for Preparing a Book Sample by Bookbinding]

Each of the adhesives obtained in the Examples and Comparative Examples was melted at 120° C. for one hour, and then applied onto a book cover having a thickness of 0.25 mm using an applicator so that the thickness of the adhesive applied became 400 μm, and a sheaf of 100 sheets of paper (woodfree paper; thickness per sheet: 0.09 mm) was put on the surface of the applied adhesive, and then allowed to stand under conditions at 23° C. and at a humidity of 50% for two days to obtain a book sample.

[Method for Evaluating the Book Opening Properties]

The obtained book sample was opened by hand, and the book opening properties were evaluated in accordance with the following criteria.

"T": After the book is opened, the book is not closed and the leaves stand still even when the hands are removed to allow the book to be as such.

"F": After the book is opened, the book is closed when the hands are removed from the book.

[Method for Evaluating the Bookbinding Strength]

Using a precision universal testing machine "AG-10NX", manufactured by Shimadzu Corporation, a bond strength (N/25 mm) of the obtained book sample was measured, and the bookbinding strength was evaluated in accordance with the following criteria.

"T": The bond strength is 30 (N/25 mm) or more.

"F": The bond strength is less than 30 (N/25 mm).

TABLE 1

|  | Example 1 | Example 2 | Example 3 | Example 4 | Comparative Example 1 | Comparative Example 2 |
|---|---|---|---|---|---|---|
| Adhesive |  |  |  |  |  |  |
| Melt viscosity at 120° C. (mPa · s) | 5,000 | 5,500 | 5,000 | 5,500 | 12,000 | 4,000 |
| Initial hardness (JIS A) | 37 | 40 | 31 | 33 | 14 | 47 |
| Final hardness (JIS A) | 88 | 89 | 84 | 85 | 82 | 98 |

TABLE 1-continued

|  | Example 1 | Example 2 | Example 3 | Example 4 | Comparative Example 1 | Comparative Example 2 |
|---|---|---|---|---|---|---|
| Cured film |  |  |  |  |  |  |
| Upper yield stress (MPa) | 5.1 | 5.3 | 4.2 | 4.4 | 3.8 | 8.3 |
| High-speed application properties | T | T | T | T | F | T |
| Cutting properties | T | T | T | T | F | T |
| Book opening properties | T | T | T | T | T | F |
| Bookbinding strength | T | T | T | T | F | T |

It can be seen that the bookbinding adhesive of the present invention has excellent high-speed application properties, excellent cutting properties, excellent book opening properties, and excellent bookbinding strength.

On the other hand, in Comparative Example 1 that is an embodiment in which the melt viscosity at 120° C. and the initial hardness fall outside their respective ranges defined in the present invention, the high-speed application properties, cutting properties, and bookbinding strength were poor.

In Comparative Example 2 that is an embodiment in which the final hardness and the upper yield stress fall outside their respective ranges defined in the present invention, the book opening properties of the book obtained by bookbinding were poor.

The invention claimed is:

1. A bookbinding adhesive,
which includes a moisture-curing polyurethane hot-melt adhesive containing an urethane prepolymer having an isocyanate group, which is obtained by reacting a polyol (A) with a polyisocyanate (B), wherein the polyol (A) contains a crystalline polyester polyol (a-1), a polyether polyol (a-2) and acrylic polyol (a-3), the total amount of the polyol (a-1) and the polyol (a-2) is 40% by mass or more based on the mass of the polyol (A), and the amount of the acrylic polyol (a-3) used is in the range of from 1 to 30% by mass based on the mass of the polyol (A), wherein the polyol (A) further contains a polycaprolactone polyol (a-4); and
which has a melt viscosity in the range of from 1,000 to 10,000 mPa·s, as measured at 120° C. by means of a cone plate viscometer, exhibits a JIS A hardness of 20 or more, as measured with respect to the adhesive which is applied and allowed to stand for 30 minutes, in an atmosphere at 23° C., and exhibits a JIS A hardness of 95 or less, as measured with respect to the adhesive which which is applied and allowed to stand for 30 minutes, in an atmosphere at 23° C., and is then allowed to stand in an atmosphere at 23° C. and at a humidity of 50% for one week, a cured film of the adhesive having an upper yield stress of 7 MPa or less.

* * * * *